United States Patent Office 3,296,166
Patented Jan. 3, 1967

3,296,166
STABILIZING VINYLIDENE POLYMERS BY HEATING
Francis John Whitby, Newport, England, assignor to Monsanto Chemicals Limited, London, England, a British company
No Drawing. Filed June 14, 1961, Ser. No. 116,959
Claims priority, application Great Britain, June 29, 1960, 22,775/60
10 Claims. (Cl. 260—29.6)

This invention relates to a process for improving the properties of aqueous dispersions, and particularly to an improved process for increasing their mechanical stability.

Aqueous dispersions have important and valuable uses in many industrial fields, but they are sometimes unstable when they are subjected to shearing forces, and in order to guard against this an additive such as for instance a protective colloid is often incorporated. In many instances, however, there is still a tendency for the dispersions to become thixotropic or for their viscosity to increase when they are stored for long periods.

There has now been found a simple method by which dispersions can be given considerable mechanical stability, with a very much reduced tendency to thicken or to become thixotropic on storage.

The process of the invention is one for improving the mechanical stability of an aqueous dispersion, in which the dispersion is treated at an elevated temperature with a stablising agent comprising a water-soluble organic polymeric polyelectrolyte, such that any tendency of the dispersion on storage to become thixotropic or more viscous is substantially reduced.

The polyelectrolyte contains ionizing groups (which can be anionic or cationic) and dissolves in water to form polyions. Preferably it also contains oil-soluble groups, for example alkyl groups of medium chain length (usually from 4 to about 12 carbon atoms). The polyelectrolyte is often used in the form of a water-soluble salt. Naturally occurring polyelectrolytes, for example shellac, can be used, but it is very convenient to use polyelectrolytes prepared by synthetic methods, particularly by polymerisation or copolymerisation. Polyelectrolytes containing anionic groups can for example be made by the polymerisation or copolymerisation of alpha-beta-ethylenically unsaturated carboxylic acids such as acrylic acid, methacrylic acid, crotonic acid, maleic acid, fumaric acid, citraonic acid, mesaconic acid, itaconic acid, or glutaconic acid, or of the anhydrides of these acids, such as maleic anhydride for example. Polymerised half-esters of alpha-beta unsaturated dicarboxylic acids and 1–12 carbon atom alkanols are especially suitable, and it is usually desirable to use a copolymer of the carboxyl-containing monomer with an ethylenic hydrocarbon such as ethylene, propylene, butylene, butadiene, isoprene, diisobutylene, or an aromatic olefin such as styrene, alpha-methylstyrene or vinyltoluene. Other monomers which can be copolymersised with carboxyl-containing monomers include vinyl halides, vinylidene halides, vinyl esters, such as vinyl acetate or vinyl formate, unsaturated ethers such as vinyl methyl ether, esters of alpha-beta-ethylenically unsaturated acids such as esters of acrylic or methacrylic acid with 1–18 carbon atom alkanols, and unsaturated halides such as vinyl chloride.

The preferred polyelectrolyte is a water-soluble salt of a copolymer of an ethylenic hydrocarbon with a half-ester of an ethylenically unsaturated dicarboxylic acid and a 1–12 carbon atom alkanol and this is normally an ammonium or alkali-metal salt, such as for instance a sodium salt. Water-soluble amine salts are also useful. The copolymer is preferably one derived from an ethylenic hydrocarbon of twelve carbon atoms or less, and this hydrocarbon can be aliphatic one such as for instance ethylene, propylene, butylene, or can with advantage be an aromatic olefin such as styrene or vinyltoluene. The other monomer from which the copolymer is derived is as stated above a half-ester of an ethylenically unsaturated dicarboxylic acid and a 1–12 carbon atom alkanol, and this is preferably one derived from an acid containing from four to six carbon atoms, for example maleic acid, fumaric acid, citraconic acid, mesaconic acid, itaconic acid or glutaconic acid. The half-ester is suitably an alkyl ester, especially a lower alkyl ester (that is one derived from an alcohol containing from one to four carbon atoms), and suitable alcohols include methanol, ethanol, n- and isopropyl alcohols, and n-, sec-, and tert.-butyl alcohols. It is sometimes useful to employ mixtures of half-esters from different alcohols, for example a mixture of methyl and secondary butyl esters; mixtures containing a small proportion of a half-ester derived from a higher alcohol, such as for example hexyl alcohol or decyl alcohol, can be used if desired.

Polyelectrolytes containing anionic groups as described above are generally suitable for use in slightly alkaline dispersions, but where the dispersion is slightly acid it will usually be found advantageous to employ a polyelectrolyte containing cationic groups. The cationic polyelectrolyte can be a polymer or copolymer which contains a tri- or a penta-valent nitrogen atom, although the polyelectrolyte will usually form cations containing pentavalent nitrogen atoms when disolved in water in the form of a salt. Suitable cationic polyelectrolytes are salts with acids of polymers or copolymers containing amino groups, for instance amine salts obtained using hydrochloric acid or acetic acid; thus an amine salt can be used of a homopolymer of a dialkylaminoalkyl ester of an alpha-beta-ethylenically unsaturated aliphatic carboxylic acid, for instance an acid such as acrylic or methacrylic acid. An amine salt of a copolymer of a dialkylaminoalkyl ester of an alpha-beta-ethylenically unsaturated aliphaic carboxylic acid, for instance acrylic, methacrylic or maleic acid, with an olefinic compound copolymerisable therewith, for instance styrene, can also be used. Other suitable amine salts are salts of polymers and copolymers containing pyridine nuclei, for instance the hydrochloride or hydrosulphates of polyvinylpyridine or a copolymer of vinylpyridine with a suitable olefinic compound, such as a copolymer of vinylpyridine with acrylonitrile. The cationic polyelectrolyte can also be a quaternary ammonium salt, for instance one formed by interaction of an aliphatic or heterocyclic tertiary amine with a homopolymer of a vinyl ester of a saturated halogenated aliphatic monocarboxylic acid, such as polyvinyl chloroacetate, or alternatively the quaternary ammonium salt can for instance be one formed by the interaction of an alkyl halide, alkyl sulphate or aryl sulphonate with a polymer or copolymer containing tertiary amino groups, such as polyvinylpyridine, a copolymer of vinylpyridine, or a homopolymer or copolymer of a dialkylaminoalkyl ester of an alpha,beta-ethylenically unsaturated aliphatic carboxylic acid. Moreover, the cationic polyelectrolyte can be a polymer or copolymer containing amido groups, for instance polyacrylamide, polymethacrylamide, or an acrylamide acrylonitrile copolymer.

Other polyelectrolytes that can be employed are the polyampholytes disclosed in U.S. 2,847,403 and U.S. 2,914,510.

The amount of stablising agent used depends on the concentration and nature of the solids in the dispersion, as well as on the degree of stability which it is desired to obtain. In general from 0.1 to 5% by weight, perhaps from 0.2 to 2.5%, and preferably from 0.5-2% by weight, of the stabilising agent, based on the weight of solids in the dispersion, will be found suitable. Larger or smaller amounts than these can be used in some circumstances. A particularly suitable amount is 1% by weight, again based on the weight of solids in the dispersion.

The process is carried out at an elevated temperature, which is usually between 30° C. and 80° C., for instance between 35° C. and 60° C. Preferably it is between 40° C. and 55° C., although higher temperatures, perhaps up to 100° C., can be used in some cases, especially where the dispersion to be stabilised is one in which the dispersed phase is a polymer having a relatively high softening point. It is usually advantageous to employ the highest temperature which does not endanger the stability of the dispersion (this condition can easily be determined by means of a simple test). About 50° C. is often a very suitable temperature.

The process can be used to improve the stability of many types of dispersions, including in some instances those of pigments in a paint or other surface coating composition, but it is especially applicable to the stabilisation of polymer latices. Latices which can be stabilised include for example those of natural rubber, but are more usually those comprising a synthetic polymer or copolymer as the disperse phase. The polymer can be a resin or a rubber and can be one derived for instance from an olefinic monomer such as isoprene, butadiene, isobutylene, styrene or acrylonitrile, or can be a copolymer of two or more of such monomers. The process is especially applicable to latices of copolymers of styrene with butadiene and more especially to those of resinous copolymers in which the styrene predominates. Thus excellent results have been obtained with latices of copolymers derived from about 60 parts of styrene and 40 parts of butadiene by weight, as well as with those of polymers derived from higher proportions of styrene, for example those containing about 85 parts of styrene with 15 parts of butadiene by weight. The invention may similarly be employed to stabilise latices of virtually any other vinylidene polymer such as homopolymers and interpolymers of vinyl halides, vinylidene halides, vinyl ester of alkanoic acids of 1–18 carbon atoms, alpha,beta-unsaturated monobasic acids and derivatives thereof such as acrylic and methcrylic acid, esters of such acids with 1–18 carbon atom alkanols, acrylamide, and the like.

The dispersion to be stabilised can be one in which the dispersed phase represents a considerable proportion of the total weight of the dispersion. Thus where a polymer latex is to be stabilised this can be one having a high solids content, that is one containing over about 30% of solids by weight, particularly one containing from 40% to 73% by weight, for instance about 50% by weight. However, an improved stability can also be given to less concentrated dispersions, for example those containing about 20% by weight or less of the dispersed phase.

A further useful reduction in the viscosity of the stabilised dispersion can be achieved by the addition of conventional viscosity depressants, such as the dioleate of a polyethylene glycol of molecular weight 600 or an electrolytic viscosity depressant such as common salt. If an electrolytic viscosity depressant is added it should of course only be used in a small proportion, because of the danger of "creaming" taking place. The viscosity depressant can if desired be added to the colloidal dispersion either before or after the stabilising agent, but a preferable procedure is to add the viscosity depressant to the stabilising agent itself before the latter is added to the dispersion.

In carrying out the process, the dispersion is usually heated to the appropriate elevated temperature, the stabilising agent then being added slowly, with slow but efficient stirring, and the mixture is then kept hot for a time, preferably at least one hour, before being allowed to cool. Improved results can usually be obtained by keeping the latex hot for longer periods, for example 6 hours, and periods of up to 1 day have been used with success. The stabilising agent can conveniently be in the form of an aqueous solution of the polyelectrolyte; solutions having a concentration of from 5 to about 20% by weight can ordinarily be used, the more concentrated solutions within this range (for example those containing 10% by weight or more) being preferred because their use avoids excessive dilution of the dispersion to be stabilised. The use of the concentrated solutions is, however, sometimes limited by the fact that they are usually rather viscous, but the addition of a viscosity depressant, as described in the preceding paragraph, does facilitate such use.

The invention is illustrated by the following examples.

*Example I*

This example describes the stabilisation of a styrene/butadiene resin latex by the process of the invention.

Three thousand grams of a latex, containing about 50% by weight of a copolymer of 60 parts by weight of styrene with 40 parts by weight of butadiene, were heated with stirring to 41° C. There were then added, with stirring, 300 grams of an aqueous solution containing 10% by weight of the sodium salt of a copolymer of 53 parts by weight of styrene with 47 parts by weight of monobutyl maleate. The mixture was then stirred for a further hour, the temperature being maintained at about 50° C., and was then allowed to cool.

The latex produced had a viscosity after standing for 24 hours of 1.0 poise (determined with a Ferranti viscometer at a shear rate of 104 secs.$^{-1}$). It was found to be quite stable to mechanical shear, even after storage at room temperature for 4 weeks; at the end of this time its viscosity was 1.1 poises. There was no tendency to thixotropy after this time; the viscosity remained constant even after 5 minutes' vigorous agitation.

For the purpose of comparison, the stabilisation procedure was repeated at room temperature (that is at 20° C.). The viscosity of the stabilised latex was initially 2.1 poises, and increased rapidly on storage. After 4 weeks the latex had turned into a lumpy thixotropic mass; it broke down on agitation, but thickened again on standing for a short time.

*Example II*

This example describes the stabilisation of a styrene/butadiene copolymer latex, in which the copolymer contains a high proportion of styrene, by the process of the invention.

Three thousand grams of a latex, containing about 50% by weight of a copolymer of 85 parts by weight of styrene with 15 parts by weight of butadiene, were heated to 40° C. There were then added, with stirring, 75 grams of an aqueous solution containing 10% by weight of the sodium salt of a copolymer of 53 parts by weight of styrene with 47 parts by weight of monobutyl maleate. The mixture was then stirred for a further hour, the temperature being maintained at about 40° C., and was then allowed to cool.

The latex produced had a viscosity after standing for 24 hours of 0.6 poise (determined with a Ferranti viscometer at a shear rate of 104 secs.$^{-1}$). It was found to be quite stable to mechanical shear, even after storage at room temperature for 4 weeks; at the end of this time its viscosity was still 0.6 poise. There was no tendency to thixotropy after this time; the viscosity remained constant even after 5 minutes' vigorous agitation.

For the purpose of comparison, the stabilisation procedure was repeated at room temperature (that is at 20° C.). The viscosity of the stabilised latex was initially 1.2 poises, and increased rapidly on storage. After 4 weeks the latex had turned into a lumpy thixotropic mass; it broke down on agitation, but thickened again on standing for a short time.

Example III

This example describes the stabilisation of the styrene/butadiene copolymer latex described in the previous example, and demonstrates the rather better properties obtained by operating the process of the invention at 50° C. instead of 40° C.

The procedure described in Example II was repeated, except that the temperature of the latex was maintained at 50° C. instead of 40° C.

The resulting latex was stable and had a viscosity of 0.5 poise. After storage at room temperature for 4 weeks it was found that the viscosity of the latex was still 0.5 poise. No thixotropic properties were observed; the viscosity remained constant even after 5 minutes' vigorous agitation.

Example IV

This example describes the stabilisation of a polystyrene latex by the process of the invention.

The procedure described in Example II was repeated, except that in place of the styrene/butadiene copolymer latex there was used a latex containing 45% by weight of polystyrene and this was heated to 80° C. while the addition of the stabilising agent and the subsequent stirring were carried out. The pH of the stabilised latex was then adjusted to 10 by the addition of a suitable quantity of dilute aqueous sodium hydroxide.

The resulting latex had considerably less tendency to coagulate than had the original unstabilised latex, and moreover there was no tendency to thixotropy, and even after storage for 8 weeks.

What is claimed is:

1. In a process for improving the mechanical stability of a latex of a polymer of the group consisting of natural rubber and a synthetic vinylidene polymer by adding with agitation 0.1–5%, based on the weight of latex solids, of a water-soluble polyelectrolyte containing oil-soluble groups, the improvement which comprises heating the latex to a temperature of about 30–80° C. prior to adding the polyelectrolyte with agitation.

2. The process of claim 1 wherein the latex is heated to a temperature of about 40–50° C. prior to the addition of the polyelectrolyte.

3. The process of claim 1 wherein the water-soluble polyelectrolyte is a water-soluble salt of an interpolymer of (a) a monomer of the group consisting of alpha,beta-ethylenically unsaturated monocarboxylic acids, alpha,beta-ethylenically unsaturated dicarboxylic acids, $C_1$–$C_{12}$ alkyl half-esters of alpha,beta-ethylenically unsaturated dicarboxylic acids, anhydrides of alpha,beta-ethylenically unsaturated dicarboxylic acids, and mixtures thereof and (b) an interpolymerizable monomer of the group consisting of vinyl halides, vinylidene halides, mono- and di-olefinic hydrocarbons containing 2–8 carbon atoms, vinyl esters of carboxylic acids, esters of alpha,beta-ethylenically unsaturated carboxylic acids, vinylidene aromatic hydrocarbons, vinyl ethers, and mixtures thereof.

4. The process of claim 1 wherein the water-soluble polyelectrolyte is a water-soluble salt of a polymer of a $C_1$–$C_{12}$ alkyl half-ester of an alpha,beta-ethylenically unsaturated dicarboxylic acid.

5. The process of claim 4 wherein the water-soluble polyelectrolyte is a water-soluble salt of a copolymer of styrene and a $C_1$–$C_{12}$ alkyl half-ester of maleic acid.

6. In a process for improving the mechanical stability of a latex of a styrene/butadiene copolymer by adding with agitation 0.1–5%, based on the weight of latex solids, of a water-soluble polyelectrolyte containing oil-soluble groups, the improvement which comprises heating the latex to a temperature of about 30–80° C. prior to adding the polyelectrolyte with agitation.

7. The process of claim 6 wherein the water-soluble polyelectrolyte is a water-soluble salt of an interpolymer of (a) a monomer of the group consisting of alpha,beta-ethylenically unsaturated monocarboxylic acids, alpha,beta-ethylenically unsaturated dicarboxylic acids, $C_1$–$C_{12}$ alkyl half-esters of alpha,beta-ethylenically unsaturated dicarboxylic acids, anhydrides of alpha,beta-ethylenically unsaturated dicarboxylic acids, and mixtures thereof and (b) an interpolymerizable monomer of the group consisting of vinyl halides, vinylidene halides, mono- and di-olefinic hydrocarbons containing 2–8 carbon atoms, vinyl esters of carboxylic acids, esters of alpha,beta-ethylenically unsaturated carboxylic acids, vinylidene aromatic hydrocarbons, vinyl ethers, and mixtures thereof.

8. The process of claim 6 wherein the water-soluble polyelectrolyte is a water-soluble salt of a polymer of a $C_1$–$C_{12}$ alkyl half-ester of an alpha,beta-ethylenically unsaturated dicarboxylic acid.

9. The process of claim 8 wherein the water-soluble polyelectrolyte is a water-soluble salt of a copolymer of styrene and a $C_1$–$C_{12}$ alkyl half-ester of maleic acid.

10. A process of claim 1 in which the polymer latex is a latex of a styrene homopolymer.

References Cited by the Examiner

UNITED STATES PATENTS

| | | | |
|---|---|---|---|
| 2,138,073 | 11/1938 | Schweitzer | 260—29.7 |
| 2,798,062 | 7/1957 | Contois | 260—29.7 |
| 2,809,945 | 10/1957 | Wright et al. | 260—17 |
| 2,912,399 | 11/1959 | Bartl | 260—29.7 |

MURRAY TILLMAN, *Primary Examiner.*

L. J. BERCOVITZ, D. ARNOLD, *Examiners.*

J. ZIEGLER, E. B. WOODRUFF, *Assistant Examiners.*